United States Patent [19]
Sperber

[11] Patent Number: 5,547,057
[45] Date of Patent: Aug. 20, 1996

[54] CHANGE-SPEED GEARBOX SHIFT DEVICE

[75] Inventor: Rolf Sperber, Wendlingen, Germany

[73] Assignee: Mercedes-Benz, Germany

[21] Appl. No.: 421,932

[22] Filed: Apr. 14, 1995

[30]     Foreign Application Priority Data

Apr. 15, 1994  [DE]  Germany .......................... 44 13 169.0

[51] Int. Cl.⁶ ................................................. F16D 23/06
[52] U.S. Cl. .................... 192/53.34; 192/53.36; 74/339
[58] Field of Search .............................. 192/53.34, 53.4, 192/53.364, 53.363, 53.343, 53.36

[56]              References Cited
             U.S. PATENT DOCUMENTS

3,700,083  10/1972  Ashikawa et al. .
4,750,597   6/1988  Ikemoto et al. ...................... 192/53.34
4,776,228  10/1988  Razzacki et al. ................. 192/53.34 X
4,828,087   5/1989  Kudo et al. ........................... 192/53.34
4,830,158   5/1989  Uno et al. ............................. 192/53.34
4,998,445   3/1991  Fujiwara .......................... 192/53.34 X

*Primary Examiner*—Charles A. Marmor
*Assistant Examiner*—Saul Rodriguez
*Attorney, Agent, or Firm*—Evenson, McKeown, Edwards & Lenahan, P.L.L.C.

[57]               ABSTRACT

A shift device for a change-speed gearbox has annular shaped coil spring element, which is closed upon itself in the peripheral direction, is mounted on a synchronizer ring and can be deflected centripetally relative to the rotation axis of a shaft mounting a gear. The deflection is caused by inclined surfaces on teeth of an inner axial coupling toothing of a shift sleeve for the purpose of building up shifting and synchronizing forces.

1 Claim, 10 Drawing Sheets

CHANGE-SPEED GEARBOX SHIFT DEVICE

BACKGROUND AND SUMMARY OF THE INVENTION

The present invention relates to a shift device, and more particularly to a shift device for coupling a gear to a shaft a shift sleeve carrier is operatively fixedly arranged relative to the shaft, an outer axial coupling toothing is immovably arranged relative to the gear and concentric to a rotation axis of the shaft, an outer axial driving toothing immovably arranged relative to the shift sleeve carrier and concentric to the rotation axis and in alignment with the outer coupling toothing, an annular shift sleeve arranged concentrically to the rotation axis and for axial movement relative to the shaft, an inner axial coupling toothing immovably arranged relative to the shift sleeve and concentric to the rotation axis and in alignment with the outer coupling toothing, a synchronizer ring arranged concentric to the rotation axis and axially between the gear and the shift sleeve carrier for axial and rotational movement relative to the gear and the shaft, an outer locking toothing immovably arranged relative to the synchronizer ring and concentric to the rotation axis and in alignment with the outer coupling toothing, stops for limiting rotation between the synchronizer ring and the shaft, a pair of friction surfaces which has one friction surface associated with the synchronizer ring and one friction surface associated with the gear and is operable to be brought into frictional connection by axial relative movement of the synchronizer ring in a direction of the gear axially immovably arranged relative to the shaft, an annular shaped coil spring element closed upon itself in a peripheral direction thereof and arranged both concentrically to the rotation axis and axially between the driving toothing and the locking toothing, said element being mounted at each of a number of points on a periphery thereof on a respective supporting element immovable relative to the synchronizer ring, and at least one tooth of the inner coupling toothing arranged in a peripheral region between two supporting elements and has a radial overlap with the shaped coil spring element and, on an end face thereof facing the gear, has an inclined surface inclined relative to the rotation axis for engagement on the shaped coil spring element, whereby a root circle of the inner coupling toothing and an addendum circle of the driving toothing each lies concentrically to the rotation axis, the inner coupling toothing engages in matching driving toothing for rotational movement therewith and axial movement therealong, teeth of the inner coupling toothing which lie in a supporting element peripheral region are radially non-overlappingly arranged with respect to the shaped coil spring element, the inclined surface has a larger diameter at an end thereof facing the gear than at another end opposite the gear, the shaped coil spring element is supported substantially rigidly, relative to the synchronizer ring, in a direction of the rotation axis towards the gear, and, in respect of portions thereof lying between the supporting elements in the peripheral direction, resiliently in a centripetal direction, and that the number of points is an integral multiple of 1.

U.S. Pat. No. 3,700,083 shows the shift device in which the addendum circle of the inner coupling toothing of the shift sleeve and the root circle of the driving toothing of the shift sleeve carrier are also formed concentrically to the axis of rotation of the shaft. Consequently, the teeth of the inner coupling toothing which lie in the region of the supporting elements and which constitute the majority of the teeth of the inner coupling toothing must be markedly shortened. This shortening must be provided in order to avoid radial overlapping with the shaped coil spring element which cannot deflect radially inwards at that point so that when synchronism exists the inner coupling toothing of the shift sleeve can penetrate unhindered into the outer coupling toothing of the gear over the locking toothing of the synchronizer ring. The useful area of the inner coupling toothing is thereby greatly reduced and thus the surface pressure is increased. This is the case both during the synchronization and during torque transmission with the gear speed engaged.

An object of the present invention is to keep the reduction of the useful area of the inner coupling toothing as low as possible.

The foregoing object has been achieved according to the present invention by providing that an addendum circle of the inner coupling toothing and the root circle of the driving toothing are each composed of a number of circular lines which lie eccentrically relative to the rotation axis, the centers of the circular lines lying in separate planes which each case the rotation axis and are directed centrally relative to a supporting element, the number of circular lines being at least 2.

Because of the shift sleeve profile formed by eccentric circular lines, the shift device according to the present invention avoids the disadvantage of an excessively reduced area of the toothing inasmuch as each tooth is shortened only to the necessary extent.

BRIEF DESCRIPTION OF THE DRAWINGS

These and other objects, features and advantages of the present invention will become more readily apparent from the following detailed description thereof when taken in conjunction with the accompanying drawings wherein:

FIG. 1b is the shift device of FIG. 1 in a "synchronization/locking position" shift phase following the "initial synchronization" shift phase of FIG. 1a;

DETAILED DESCRIPTION OF THE DRAWINGS

Figure 1:
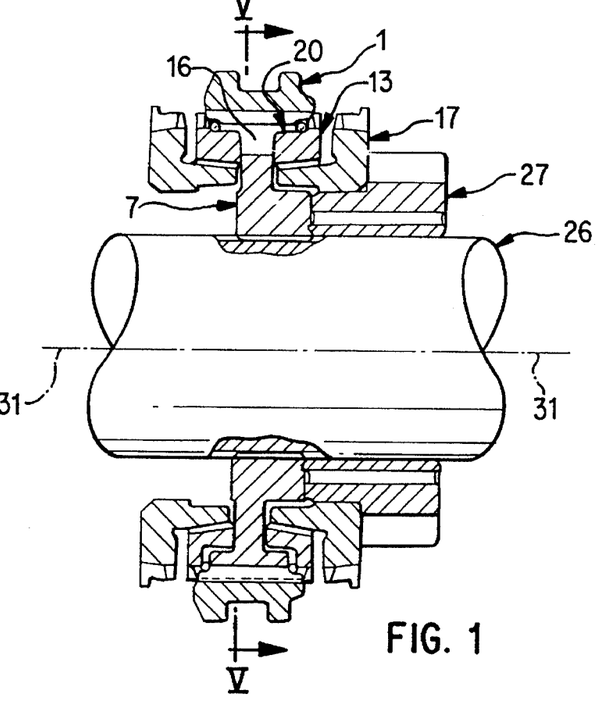
FIG. 1 is an axial partial sectional view through a shift device according to the present invention along line I—I in FIG. 5.

An annular shift sleeve carrier 7 and a gear 27 are arranged on a main shaft 26 (shown in part) of a change-speed gearbox, each concentrically to the axis of rotation 31—31 of the main shaft. While the shift sleeve carrier 7 is fixedly arranged relative to the main shaft 26, the gear 27 is mounted on the main shaft 26 for rotational movement but is axially immovable thereon.

A coupling ring 17 is arranged in an annular space between the shift sleeve carrier 7 and the gear 27. The coupling ring 17 is concentric to the rotation axis 31—31 and is secured against movement relative to the gear 27. On the outer circumference of the coupling ring 17 is provided an outer axial coupling toothing 18. A synchronizer ring 13 is provided in the annular space between the shift sleeve carrier 7 and the coupling ring 17 concentric to the rotation axis 31—31. The synchronizer ring 13 is arranged for axial and rotational movement relative both to the main shaft 26 and to the gear 27. On axial displacement of the synchronizer ring 13 in the direction of the gear 27, an inner conical friction surface 24 of the synchronizer ring 13 comes into frictional contact with an outer conical friction surface 25 of the coupling ring 17. On its outer circumference, the synchronizer ring 13 has a locking toothing 14 which is aligned with the coupling ring's outer coupling toothing 18, i.e the locking toothing 14 has the same operative diameter as the toothing 18. On its outer periphery, the shift sleeve carrier 7 has an axial driving toothing 11 which is aligned with the outer coupling toothing 18, again that the same operative diameter as the toothing 18.

An annular shift sleeve 1 is arranged concentrically to the rotation axis 31—31 and is axially movable relative both to the main shaft 26 and to the synchronizer ring 13. The shift sleeve 1 has an inner coupling toothing 2 which corresponds to the outer coupling toothing 18 and which engages in the matching driving toothing 11 for rotation therewith and axial movement relative thereto.

An annular shaped coil spring element 21 is arranged in the annular space between the driving toothing 11 and that portion of the synchronizer ring 13 which is provided with the locking toothing 14. The element 21 is closed upon itself in the peripheral direction and lies concentrically to the rotation axis 31—31 and is mounted in the following manner on the synchronizer ring 13.

First, the shift sleeve carrier 7 is provided on its outer periphery with three recesses 16 which interrupt the toothed rim of the driving toothing 11 and in each of which an axial extension 20, directed towards the shift sleeve carrier 7, of the synchronizer ring 13 engages with movement play. The surfaces bounding the recess 16 and those bounding the extension 20, in the peripheral direction, are used as stops to limit the rotational movability between the shift sleeve carrier 7 and the synchronizer ring 13. The surface 32 bounding the respective extension 20 radially outwards is used as a radial supporting element for the shaped coil spring element 21 which is thus clamped under a certain initial stress (in order to prevent the shift sleeve 1 from stripping it off the synchronizer ring 13) by the three supporting surfaces 32 on the synchronizer ring 13 such that the shaped coil spring element 21, relative to the synchronizer ring 13, (a) is substantially rigid in the direction of the rotation axis 31—31 pointing towards the gear 27, (b) can deflect centripetally by its ring portions lying, in the peripheral direction, approximately centrally between the supporting surfaces 32, and (c) cannot be detached on the return of the shift sleeve 1 from the gear speed position (FIG. 1d) to the neutral position (FIGS. 1 to 4).

Figure 6:
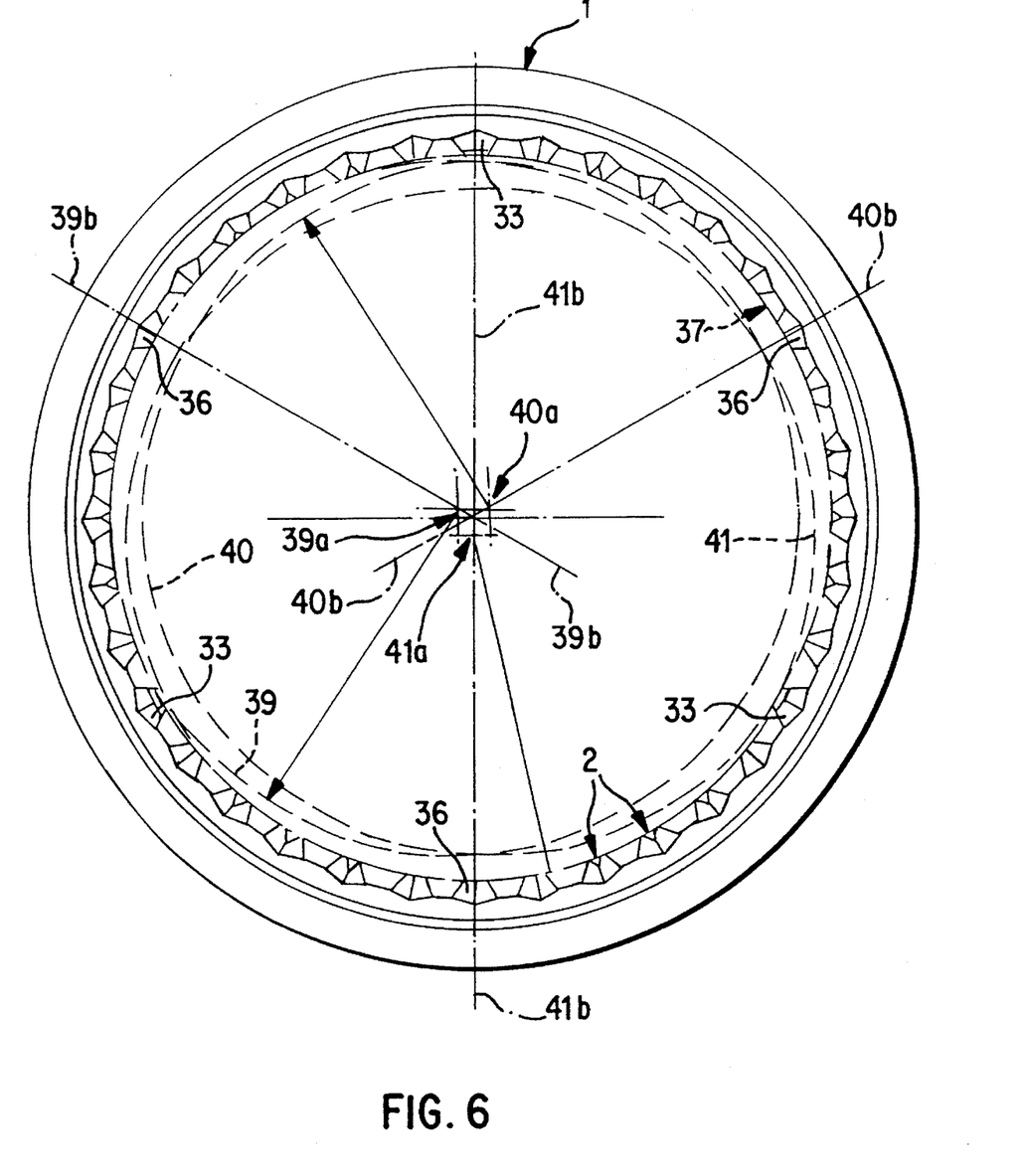
FIG. 6 is a front view of the shift sleeve as a detail of the shift device shown in FIG. 1, on the same scale as FIG. 5.
Figure 7:
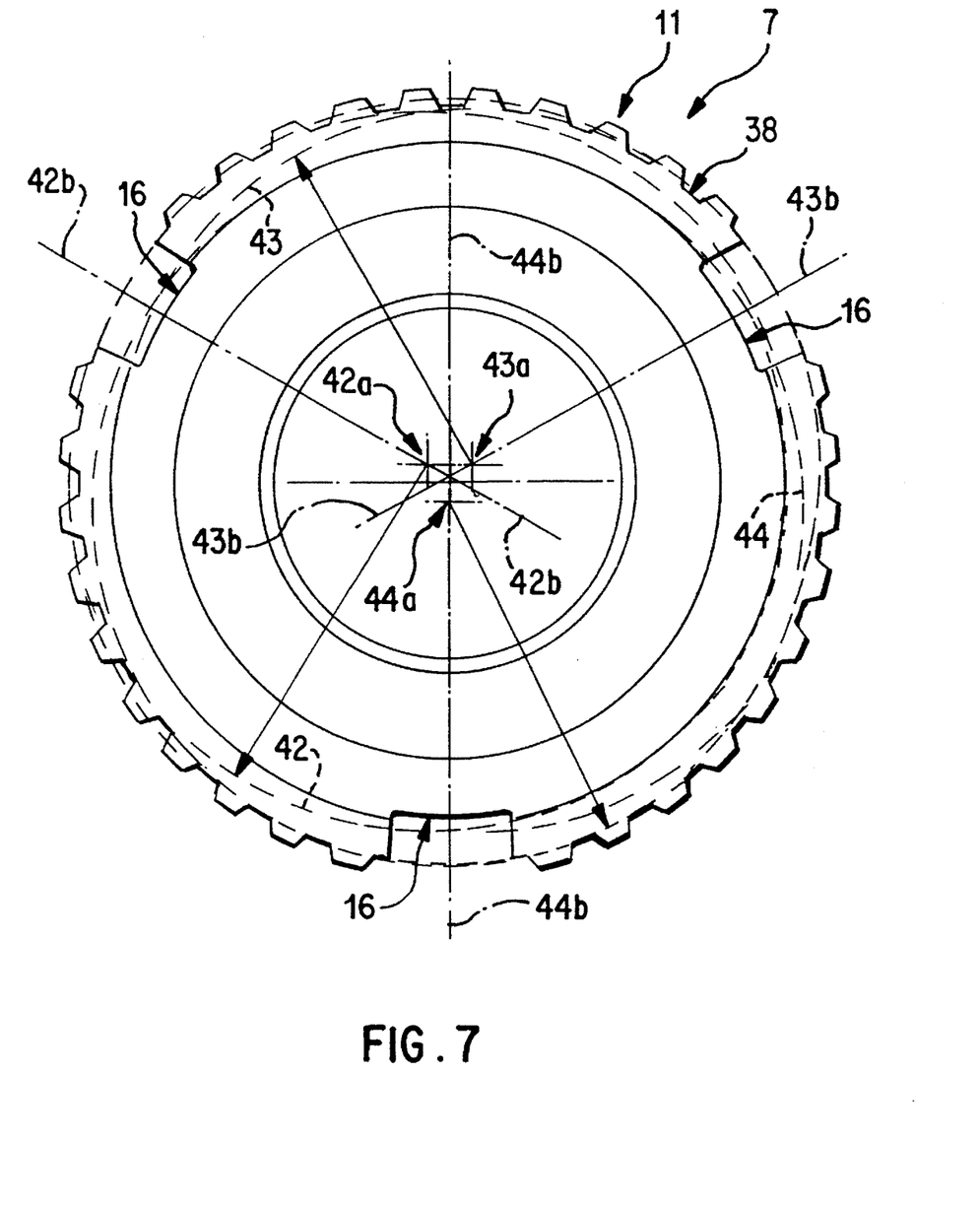
FIG. 7 is a front view of the shift sleeve carrier as a detail of the shift device shown in FIG. 1, on the same scale as FIG. 5.
Figure 8:
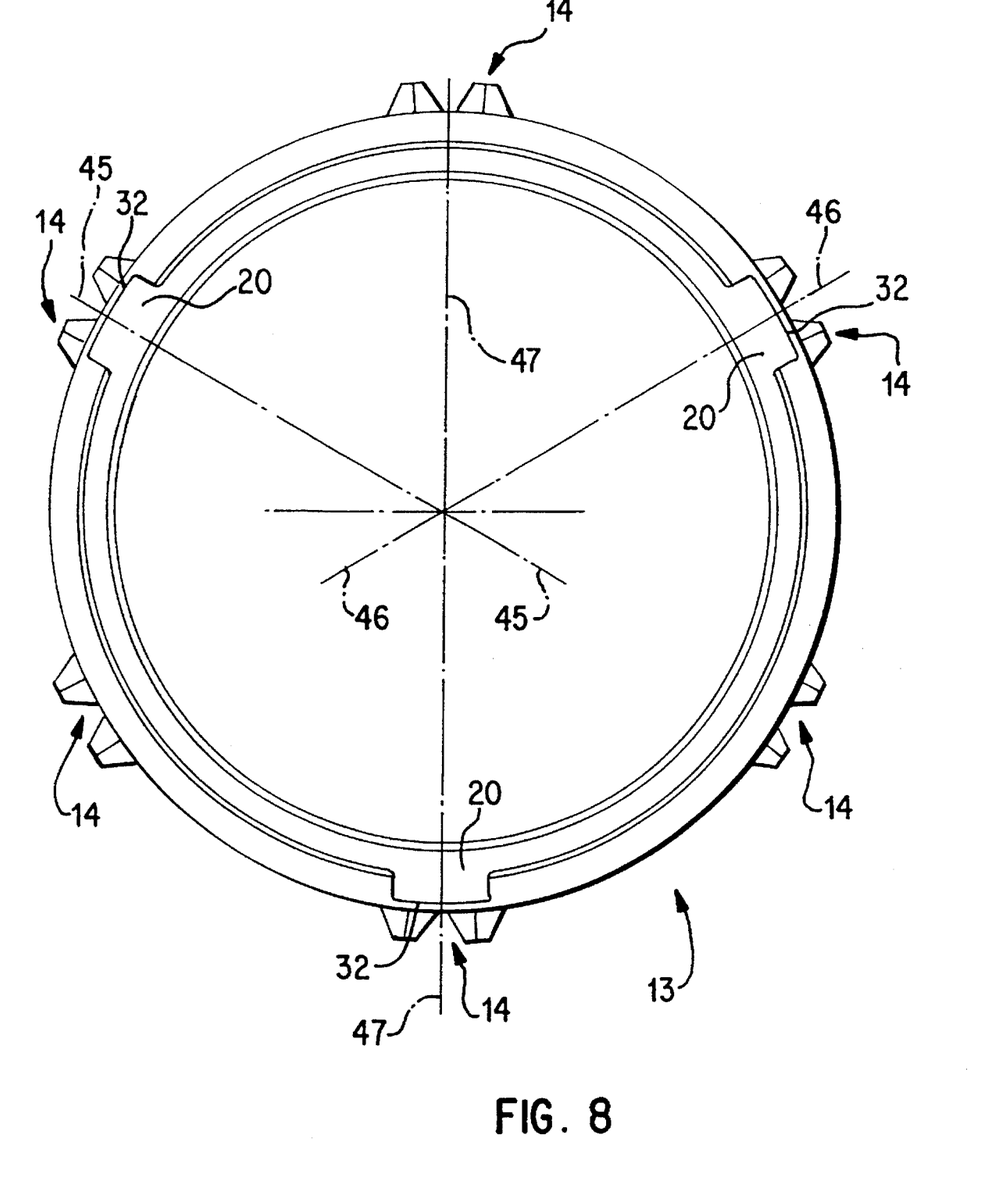
FIG. 8 is a front view of the synchronizer ring as a detail of the shift device shown in FIG. 1, on the same scale as FIG. 5.

To deflect the middle ring portions of the shaped coil spring element 21 radially in the direction of the gear 27 on the operation of the shift sleeve 1 from the neutral position (FIGS. 1 to 4), the center planes of the extensions 20, and thus also of the supporting surfaces 32 on the synchronizer ring 13, lie in each case in one of three axial planes 45—45, 46—46 and 47—47 of the synchronizer ring 13 which are offset by 120 degrees relative to each other and contain the axis of the ring (FIG. 8). Correspondingly, the center planes of the recesses 16 in the shift sleeve carrier 7 lie in each case in one of three axial planes 42b—42b, 43b—43b and 44b—44b which are offset by 120 degrees relative to each other and contain the center axis of the shift sleeve carrier 7 (FIG. 7). In a corresponding manner, three reference planes 39b—39b, 40b—40b and 41b—41b, which are offset by 120 degrees relative to each other and contain in each case the center axis of the shift sleeve, are provided on the shift sleeve 1 (FIG. 6).

The teeth 36 of the inner coupling toothing 2 of the shift sleeve 1 which lie in the region of the reference planes are reduced in respect of their tooth height so that they can pass over the shaped coil spring element 21 which in this region cannot deflect because of its support on the supporting surfaces 32. The teeth 33 of the inner coupling toothing 2 of the shift sleeve 1 which lie in the middle peripheral region between the reference planes are so configured in respect of their tooth height that a radial overlap exists between the tips of the teeth 33 and the outer periphery of the shaped coil spring element 21. These so-called higher teeth 33 have on their ends facing the gear 27 an inclined surface 22 (FIG. 2) which widens in the direction of the gear and thus causes the shaped coil spring element 21 to deflect centripetally in the direction of the gear 27 on the operation of the shift sleeve 1.

According to the present invention, a "continuous" transition between the different heights of the teeth 33 and 36 is now obtained by a common addendum circle 37 (FIG. 6), which is composed of three (32 the number of supporting surfaces 32) circular lines 39, 40 and 41 directed eccentrically relative to the center axis of the shift sleeve 1 (32 axis of rotation 31—31). The geometrical location for the respective center 39a, 40a and 41a of the circular lines 39, 40 and 41 is the appertaining reference plane 39b—39b, 40b—40b or 41b—41b, respectively. The center in each case then lies offset in the direction of the tooth 36 having the smaller height, relative to the center axis (or rotation axis 31—31).

A corresponding toothing geometry is also provided for the driving toothing 11 of the shift sleeve carrier 7. Consequently, the root circle 38 of the driving toothing 11 is composed of three circular lines 42, 43 and 44 directed eccentrically relative to the center axis (rotation axis 31—31) of the shift sleeve carrier 7 and having their centers 42a, 43a and 44a situated in each case in the appertaining reference plane 42b—42b, 43b—43b and 44b—44b, namely offset in each case in the direction of the appertaining recess 16 relative to the center axis (rotation axis 31—31).

Figure 3:
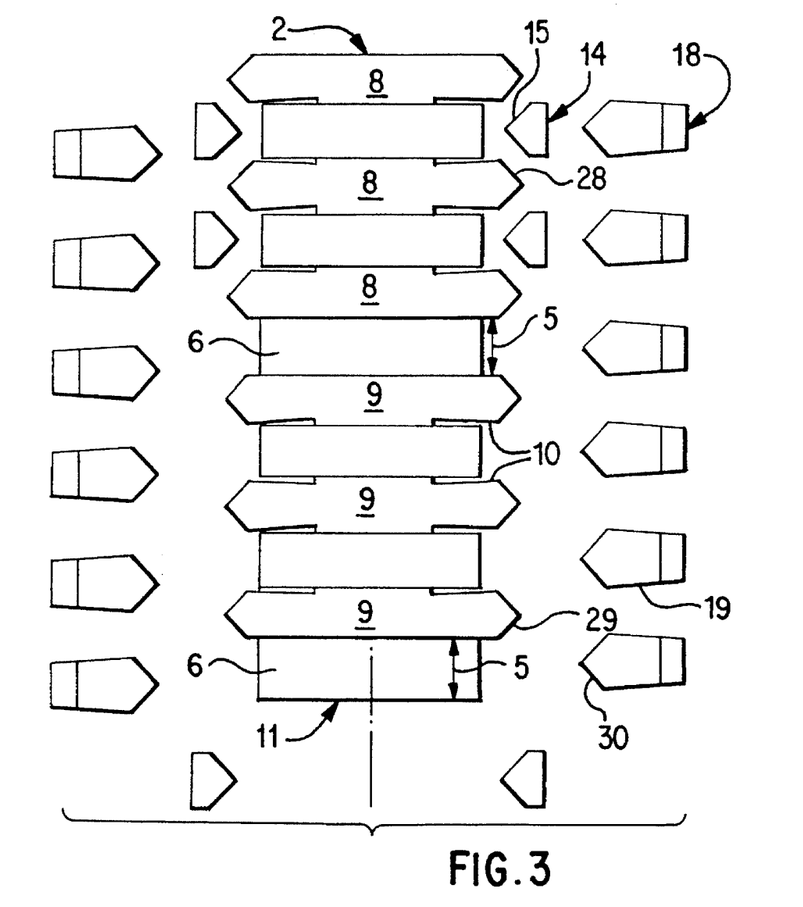
FIG. 3 is a sectional view through the toothings of the shift device shown in FIG. 1, developed on the enlarged scale of FIG. 2.

The inner coupling toothing 2 consists of thirty-six teeth in six identical packets. As seen in FIG. 3, each third tooth gap is made larger and has a guiding function in conjunction with the corresponding teeth 6 of the driving toothing 11. The guiding tooth flanks have no backing for gear speed locking.

In each of the packets of six teeth three teeth 8 are provided side by side and have inclined surfaces 28 arranged in a roof shape for the locking function, and also three teeth 9 having inclined surfaces 29 arranged in a roof shape for the meshing function. There is thus a half-and-half distribution of locking and meshing teeth.

The end points of the inclined surfaces 28 and 29 lie on the same axial dimension. In the shifted position, therefore, all teeth having a backing 10 participate in torque transmission.

Each third tooth 6 of the driving toothing 11 is made bigger to correspond to the tooth gaps 5 and has a guiding function.

In the synchronizer ring 13, the locking toothing 14 is made with inclined surfaces 15 arranged in a roof shape in accordance with the locking teeth 8 of the shift sleeve 1. The locking toothing 14 consists of six packets each having two locking teeth. These packets are arranged exactly opposite the tooth gaps of the locking teeth 8 of the shift sleeve 1 and can be brought into engagement therewith.

The teeth of the outer coupling toothing 18 of the coupling ring 7 have a backing 19 on both flanks for gear speed locking. The root circle of the coupling toothing 18 is obtained from the smallest root diameter of the driving toothing 11 of the shift sleeve carrier 7. The teeth of the outer coupling toothing 18 have roof-shaped inclined surfaces 30, correspondingly to the inclined surfaces 29 on the shift sleeve 1.

Finally, in a conventional manner the root circle 34 of the inner coupling toothing 2 and the addendum circle 35 of the driving toothing 11 each lie concentrically to the respective center axis (rotation axis 31—31).

The function of the shift device can be seen in the shift phases illustrated in FIGS. 1a to 1d, 3a to 3d and 4a to 4d.

Figure 1A:
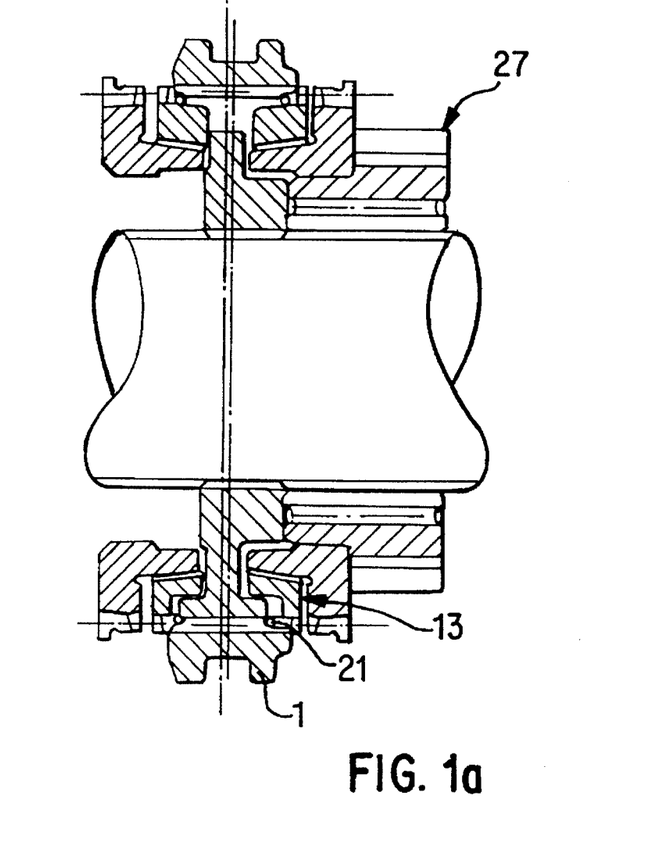
FIG. 1a is the shift device of FIG. 1 in an "initial synchronization" shift phase initiating a gear shift.
Figure 3A:
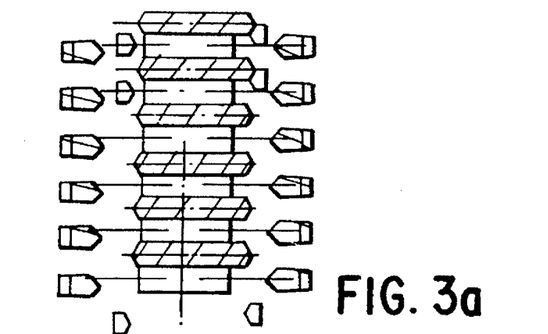
FIG. 3a shows the toothings of FIG. 3 in the "initial synchronization" shift phase.
Figure 4:
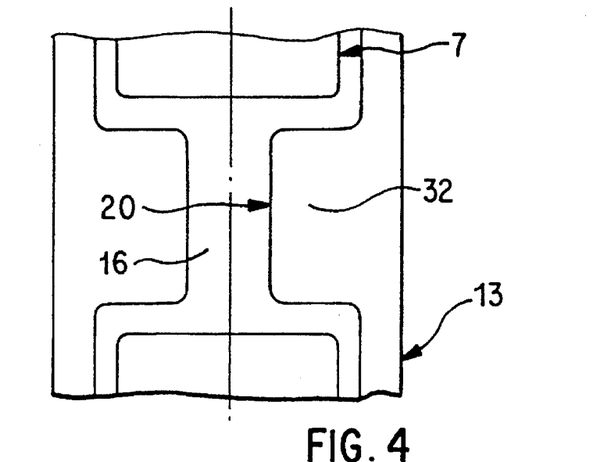
FIG. 4 is a sectional view through the stop for limiting the rotational movability of the synchronizer ring of the shift device shown in FIG. 1, developed on the enlarged scale of FIG. 2.
Figure 4A:
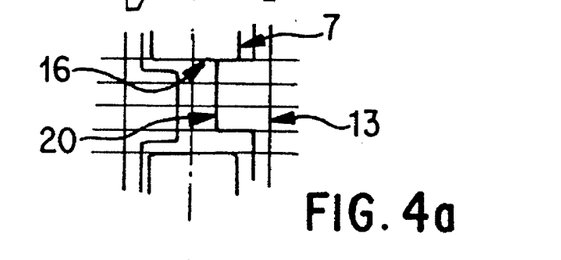
FIG. 4a shows the stop of FIG. 4 in the "initial synchronization" shift phase.

According to FIGS. 1a, 3a and 4a, the shift sleeve 1 is moved axially out of its neutral position in order to engage the gear speed. The shaped coil spring element 21 and the synchronizer ring 13 participate in the axial movement until the two friction surfaces 24 and 25 come into contact with one another. On further axial movement of the shift sleeve 1 the shaped coil spring element 21 must be deflected radially by the inclined surfaces 22, whereby an axial force is also produced which acts on the synchronizer ring 13. When the synchronizer ring 13 and the gear 27 rotate at different speeds, the axial force produces a torque which deflects the synchronizer ring 13 in the peripheral direction relative to the shift sleeve carrier 7. This "initial synchronization" lasts until the stops 16, 20 come into contact with one another.

Figure 1B:
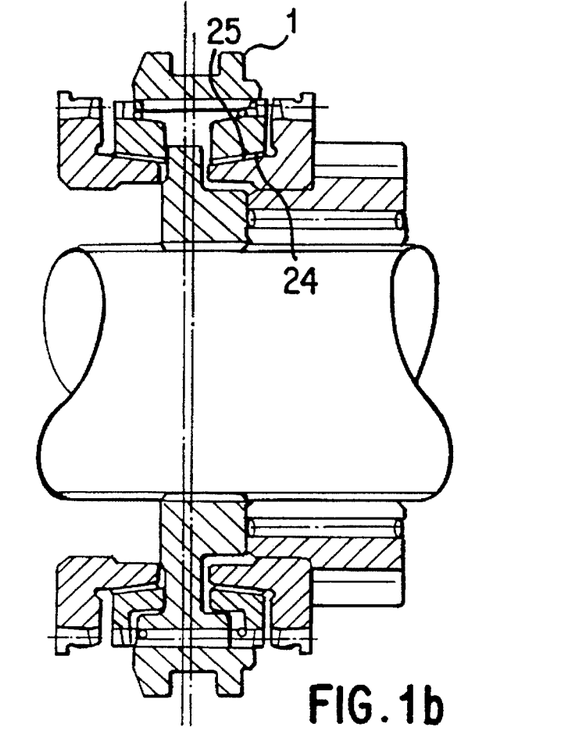
Figure 3B:
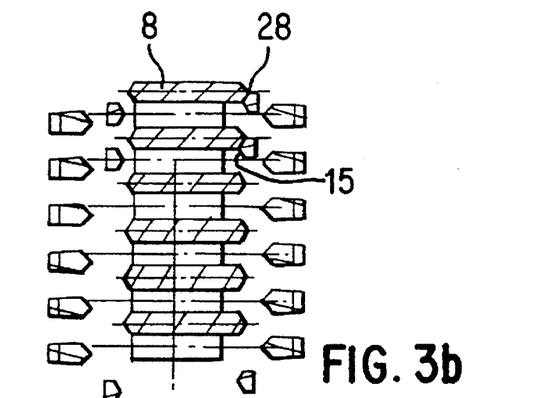
FIG. 3b shows the toothings of FIG. 3 in the "synchronization/locking position" shift phase.
Figure 4B:
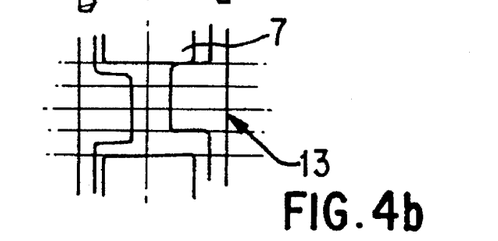
FIG. 4b shows the stop of FIG. 4 in the "synchronization/locking position" shift phase.

The synchronization system is now in the "locking position" (FIGS. 1b, 3b and 4b). The axial force introduced is transmitted via the locking teeth 8 into the synchronizer ring 13 and with the aid of the conical surfaces 24 and 25 produces a torque which equalizes the speeds of rotation of the shaft 26 and the gear 27. At the same time the inclined surfaces 15 and 28 prevent the shift sleeve 1 from being moved axially beyond the locking position before synchronism has been achieved.

Figure 1C:
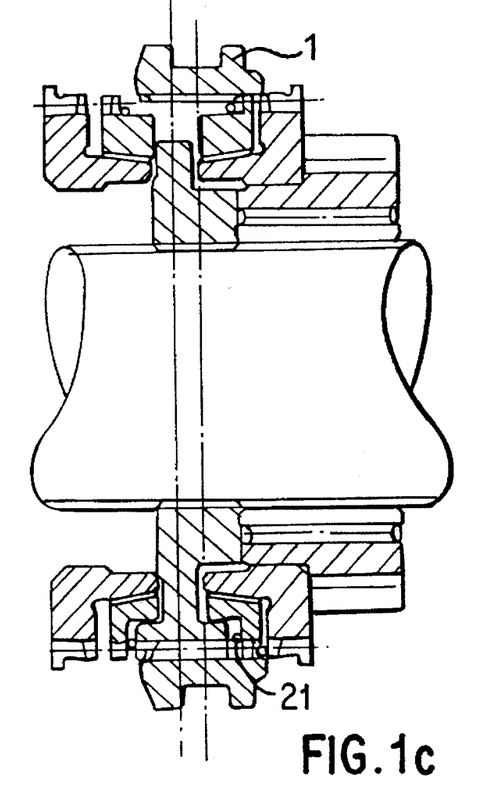
FIG. 1c is the shift device according to FIG. 1 in a "meshing" shift phase following the "synchronization/locking position" shift phase of FIG. 1b.
Figure 3C:
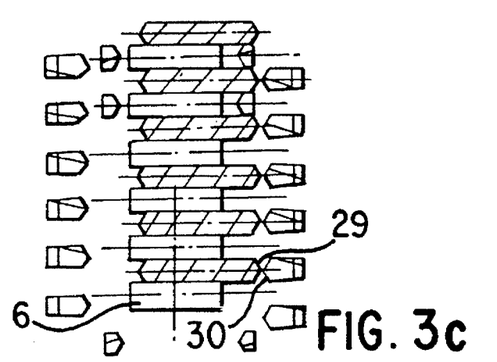
FIG. 3c shows the toothings of FIG. 3 in the "meshing" shift phase.
Figure 4C:
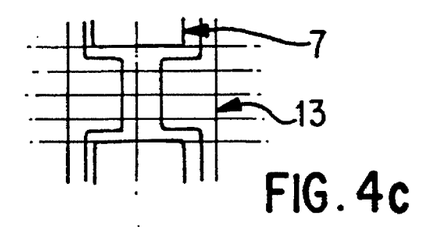
FIG. 4c shows the stop of FIG. 4 in the "meshing" shift phase.
Figure 5:
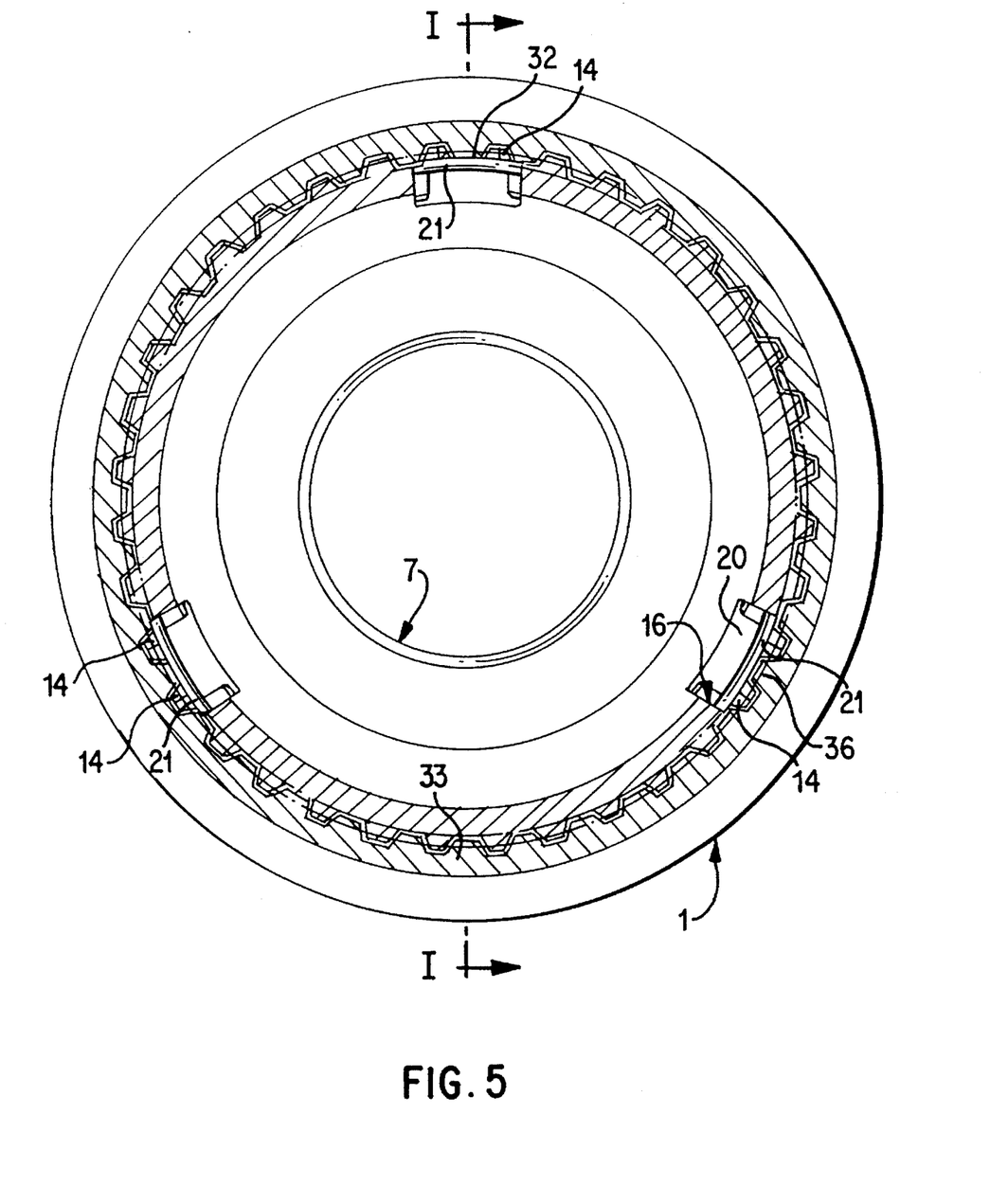
FIG. 5 is a cross-sectional view through the shift device along line V—V of FIG. 1 on a scale which is larger than the scale of FIG. 1 but smaller than the scale of FIG. 2.

After synchronism has been achieved the shift sleeve 1 can be moved further and be aligned by the inclined surfaces 29 and 30 ("meshing" in FIGS. 1c, 3c and 4c).

Figure 1D:
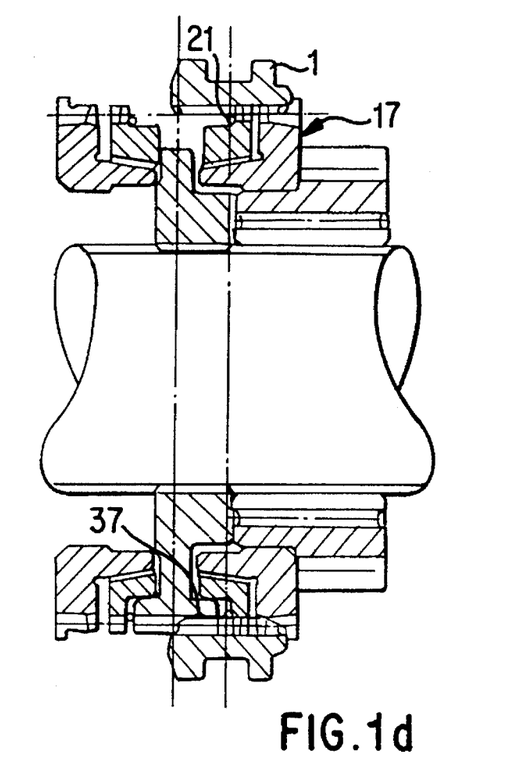
FIG. 1d is the shift device according to FIG. 1 in an "end position" shift phase following the "meshing" shift phase of FIG. 1c and corresponding to the new gear speed position.
Figure 2:
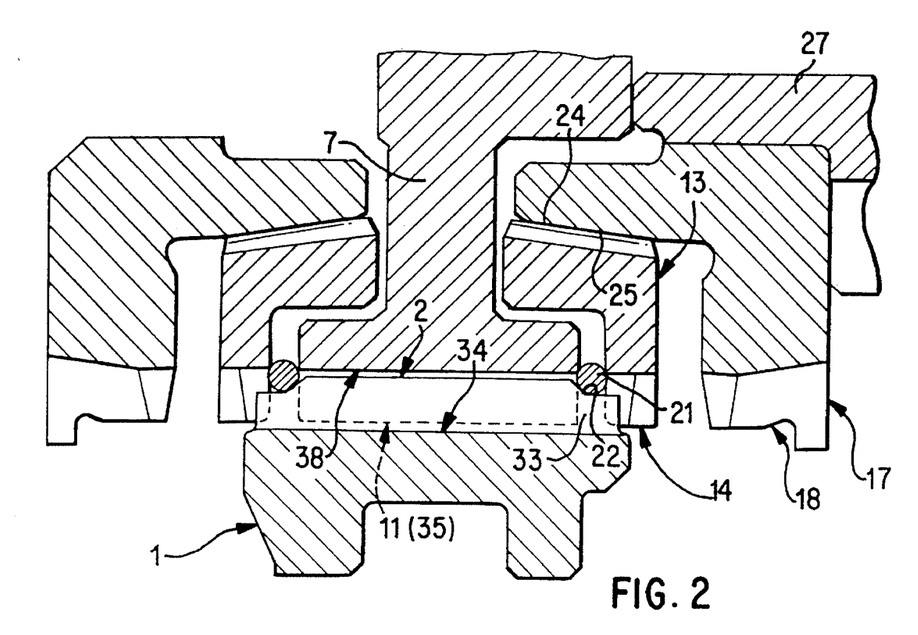
FIG. 2 is an enlarged cross-sectional view of a portion of the shift device shown in FIG. 1.
Figures 3D, 4D:
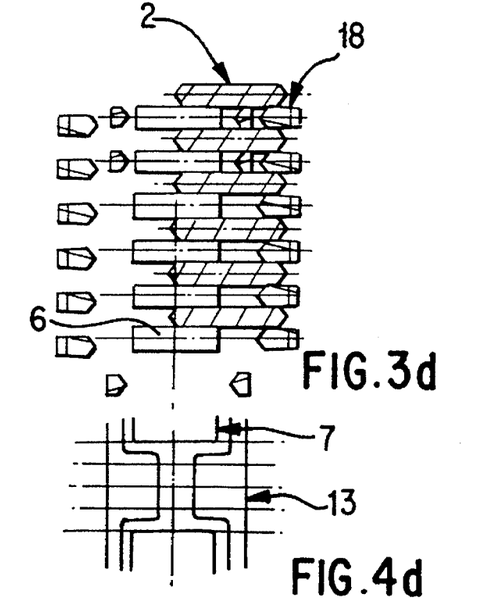
FIG. 3d shows the toothings of FIG. 3 in the "end position" shift phase.
FIG. 4d shows the stop of FIG. 4 in the "end position" shift phase.

The coupling toothing 2 of the shift sleeve 1 and the coupling toothing 18 of the coupling ring 17 can then be brought into engagement until the "end position" is reached (FIGS. 1d, 3d and 4d).

During the shift operation, that is to say after leaving the "locking position" (FIGS. 1b, 3b and 4b), the annular shaped coil spring element 21, which in this phase has no further function, is definitively adapted to the shift sleeve addendum circle 37 produced by the eccentric circular lines 39 to 41.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Shift device for a change-speed gearbox, wherein for coupling a gear to a shaft a shift sleeve carrier is operatively fixedly arranged relative to the shaft, an outer axial coupling toothing is immovably arranged relative to the gear and concentric to a rotation axis of the shaft, an outer axial driving toothing immovably arranged relative to the shift sleeve carrier and concentric to the rotation axis and in alignment with the outer coupling toothing, an annular shift sleeve arranged concentrically to the rotation axis and for axial movement relative to the shaft, an inner axial coupling toothing immovably arranged relative to the shift sleeve and concentric to the rotation axis and in alignment with the outer coupling toothing, a synchronizer ring arranged concentric to the rotation axis and axially between the gear and the shift sleeve carrier for axial and rotational movement relative to the gear and the shaft, an outer locking toothing immovably arranged relative to the synchronizer ring and concentric to the rotation axis and in alignment with the outer coupling toothing, stops for limiting rotation between the synchronizer ring and the shaft, a pair of friction surfaces which has one friction surface associated with the synchronizer ring and one friction surface associated with the gear and is operable to be brought into frictional connection by axial relative movement of the synchronizer ring in a direction of the gear axially immovably arranged relative to the shaft, an annular shaped coil spring element closed upon itself in a peripheral direction thereof and arranged both concentrically to the rotation axis and axially between the driving toothing and the locking toothing, said element being mounted at each of a number of points on a periphery thereof on a respective supporting element immovable relative to the synchronizer ring, and at least one tooth of the inner coupling toothing arranged in a peripheral region between two supporting elements and has a radial overlap with the shaped coil spring element and, on an end face thereof facing the gear, has an inclined surface inclined relative to the rotation axis for engagement on the shaped coil spring element, whereby a root circle of the inner coupling toothing and an addendum circle of the driving toothing each lies concentrically to the rotation axis, the inner coupling toothing engages in matching driving toothing for rotational movement therewith and axial movement therealong, teeth of the inner coupling toothing which lie in a supporting element peripheral region are radially non-overlappingly arranged with respect to the shaped coil spring element, the inclined surface has a larger diameter at an end thereof facing the gear than at another end opposite the gear, the shaped coil spring element is supported substantially rigidly, relative to the synchronizer ring, in a direction of the rotation axis towards the gear, and, in respect of portions thereof lying between the supporting elements in the peripheral direction, resiliently in a centripetal direction, and that the number of points is an integral multiple of one, wherein an addendum circle of the inner coupling toothing and the root circle of the driving toothing are each composed of a number of circular lines which lie eccentrically relative to the rotation axis, the centers of the circular lines lying in separate planes which each case the rotation axis and are directed centrally relative to a supporting element, the number of circular lines being at least two.

* * * * *